though, and on the external end of the rod there is a threaded connection with a metal probe 13. The upper end of the body is annularly recessed and a removable tube 14 of insulating material is suitably secured to the body by a screw 15 or the like.

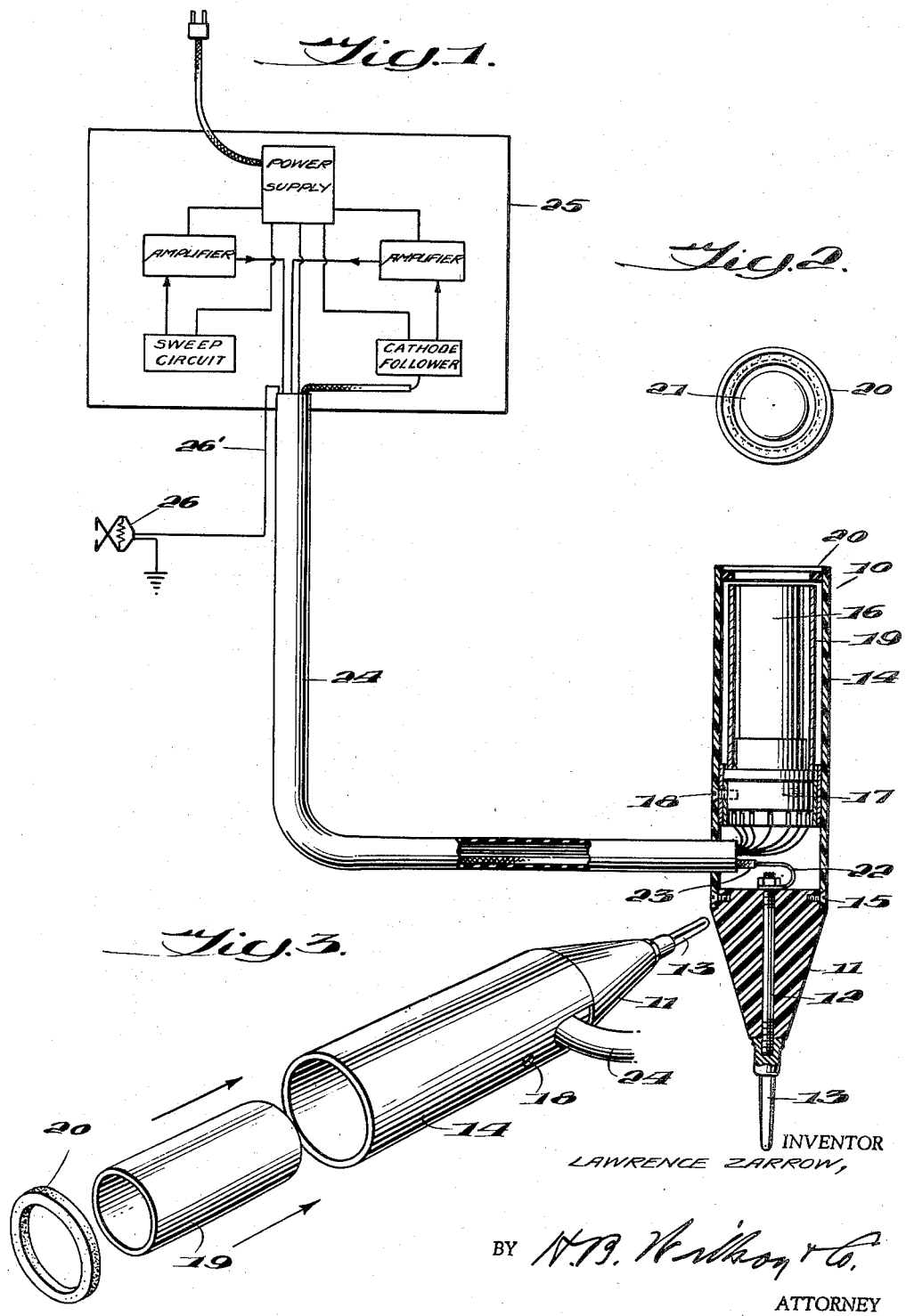

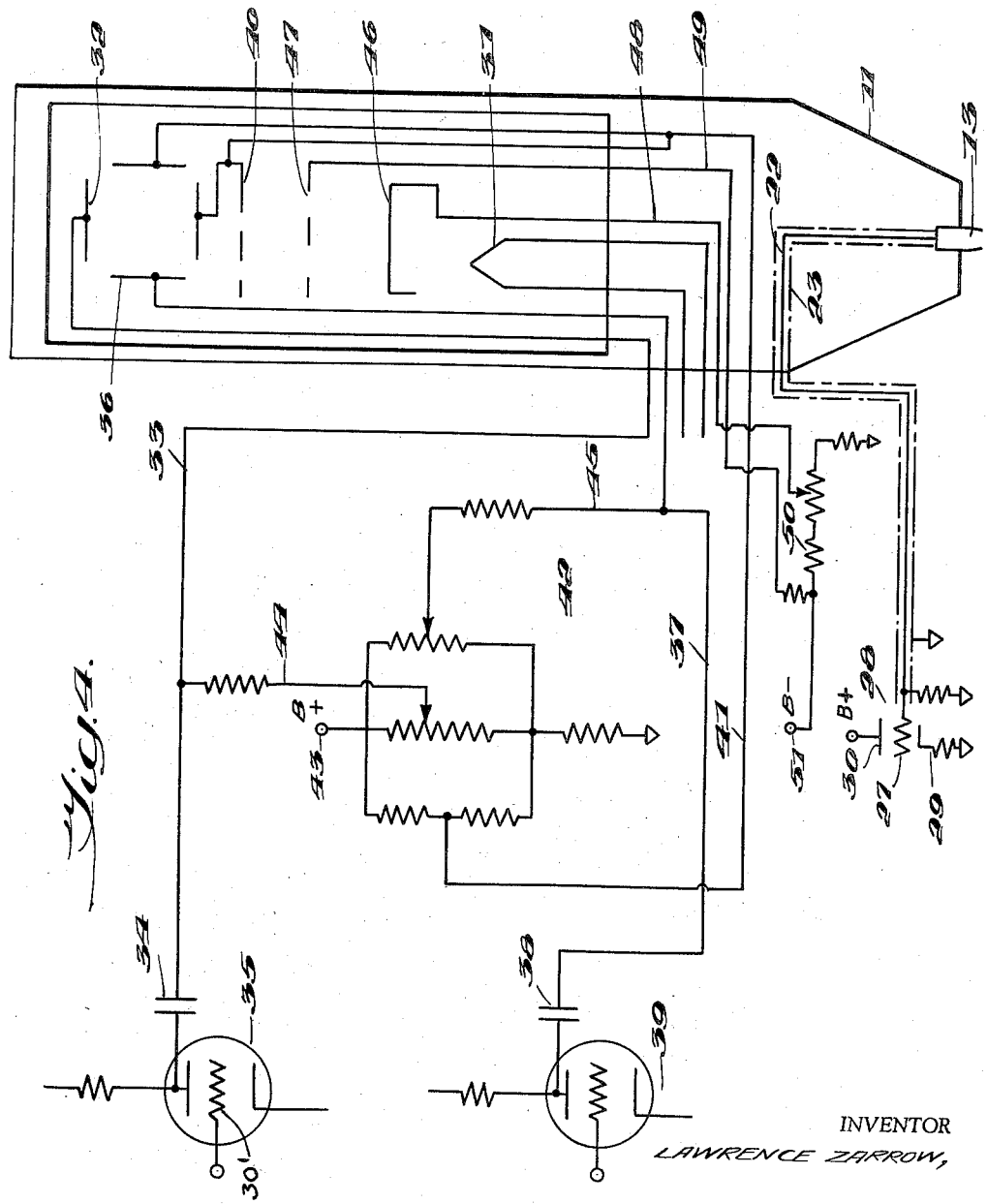

United States Patent Office

2,849,641
Patented Aug. 26, 1958

2,849,641

WAVE INDICATING MEANS

Lawrence Zarrow, Jackson Heights, N. Y.

Application July 12, 1955, Serial No. 521,497

5 Claims. (Cl. 315—1)

The present invention relates in general to instruments for indicating wave forms of current and voltage in electrical circuits, and in particular to a wave form indicating instrument which may be carried in one hand of a person, and has a probe thereon for application to an electrical device in exploring wave forms in different parts of the device.

It is an object of this invention to provide a cathode ray oscilloscope tube in a small insulating tube to be carried in the hand, and with the insulating tube being provided with a probe at one end thereof so that when the probe is applied to an electrical circuit the wave form of voltage in the electrical circuit can be immediately observed on the end of the cathode ray tube.

It is an object of this invention to provide a cathode ray tube housed in an insulating tube to be carried in the hand, and with the insulating tube having a metallic probe projecting from one end thereof and applicable to an electrical circuit so that the wave form of the voltage in the circuit may be immediately observed at the other end of the tube on the cathode ray tube, and to provide a cable connecting the probe and the cathode ray tube with a remotely placed source of timed voltages for the functioning of the cathode ray tube in response to a signal voltage on the metallic probe.

It is an object of this invention to house a cathode ray tube in an insulating tube which may be carried in the hand, to provide adequate shielding means in the insulating tube to shield the cathode ray tube against external fields, to provide the insulating tube with an externally projecting metallic probe, and to provide means whereby the wave form of the voltage in an electrical circuit is immediately observable on the cathode ray tube when the probe is applied to an electrical circuit being tested.

The invention will be more fully understood from the following detailed description, taken in connection with the accompanying drawings, in which:

Figure 1 shows the probe device of the present invention partly in section and partly in plan, with a cable going from the cathode ray tube and the probe to a source of power and cathode ray tube control voltage shown diagrammatically, Figure 2 is a plan view of the upper end of the probe device of Figure 1, Figure 3 is an exploded view of the probe device to show the internal shield, and Figure 4 is a wiring diagram showing elements of the circuits between the cathode ray tube and the source of control voltages.

A wave indicating device 10 is formed by a solid tapered end body portion 11 of suitable insulating material, and it is bored to receive a metal rod 12 which passes therethrough, and on the external end of the rod there is a threaded connection with a metal probe 13. The upper end of the body is annularly recessed and a removable tube 14 of insulating material is suitably secured to the body by a screw 15 or the like.

A cathode ray tube 16 is entered in a socket 17, which is secured to the wall of the tube 14 by a screw 18, and a shielding tube 19 of mu metal rests on the socket 17 to shield the cathode ray tube against external fields. The upper end of the insulating tube is provided with a ring 20 of insulating material, and the upper end of the cathode ray tube, indicated at 21, is viewable through this ring. The end 21 may carry conventional zero lines.

The upper end of the metal rod 12 is connected to a wire 22 which is enclosed in a metal sheathing 23 and extends through a cable 24 to a casing, indicated generally at 25, and which casing contains conventional rectifiers, amplifiers, sweep circuit, and control voltage sources for the viewing electrodes of the cathode ray tube. An expandable clip 26 is connected to the sheath 26 by a wire 26', or is connected to the chassis of the conventional source of voltages in the casing 25, and is connected to the electrical circuit being tested by the probe.

The wave indicating device 10 is of such a diameter and length that it can be readily carried in one hand, and when the probe 13 is applied to an electrical circuit of a television or radio receiver, with the clip 26 attached to the chassis of the receiver, the wave shape of the voltage, and its relative value, can be immediately observed on the end of the cathode ray tube while the inspector is looking directly at the component of the circuit under inspection.

The casing 25, referred to above, is small and portable, so that the cable 24 need not be unduly long.

In Figure 4 there is shown the internal elements of the cathode ray tube and some of the essential control elements connected thereto. The sources of D. C. voltage have been omitted, and since the control equipment in the casing 25, is conventional no claims are made to the circuits therein.

The signal voltage from the probe 13 is carried over the wire 22, to a grid 27, of a vacuum tube 28. The cathode 29 of the tube 28 is grounded to the chassis through a suitable resistor, and the plate 30 is connected to a source of voltage, not shown.

The filament 31 of the cathode ray tube is suitably connected to a source of current, not shown, to heat the filament.

One of the vertical deflecting electrodes 32 of the cathode ray tube is connected by a wire 33, through a capacitor 34, to the plate of a vacuum tube 35, and one of the horizontal deflecting electrodes 36, is connected by a wire 37, through a capacitor 38, to a vacuum tube 39. The other deflecting electrodes are connected to the anode 40 of the cathode ray tube and by a wire 41 to a tap in a resistance network 42 which is connected to a source of voltage as indicated at 43 and which network is also connected to the wire 33 through a wire 44, and to the wire 37, by a wire 45.

The cathode 46, and the grid 47 of the cathode ray tube are connected by wires 48 and 49, respectively, to a resistor network 50, which is connected to the negative pole B—, indicated at 51 of a source of voltage not shown, the positive pole B+ of the source being connected to the plate 30, of the tube 28, as is well understood by those familiar with the art.

The plate 30 of the tube 28 is also coupled, by a circuit not shown, to the grid 30' of the vertical gain amplifier tube 35. When the input signal from the probe varies the voltage of the grid 27 it produces a corresponding change in the voltage of the plate 30 of the tube 28. This change in plate voltage is coupled to the grid 30' of the tube 35 and as a result varies the plate voltage of that tube. The change in plate voltage of the tube 35 is transmitted through coupling capacitor 34 and line 33 to the vertical deflection plate 32 of the cathode ray tube where it causes the appearance of a waveform pattern on the ray tube screen in the conventional manner.

While a specific embodiment has been illustrated and described, it will be understood that various changes and modifications may be made without departing from the spirit and scope of the invention.

I claim:

1. In a wave indicating means, a tube of insulating material adapted to be carried in the hand of a person, a cathode ray oscilloscope tube within said tube of insulating material and having ray deflecting electrodes, an end of said cathode ray tube being viewable through an end of said insulating tube for the observance of wave shape on said end of said cathode ray tube, a metallic tubular shield in said insulating tube and about said cathode ray tube, and a metallic probe secured to said insulating tube and extending outwardly therefrom.

2. Circuit testing means for connection to a conventional source of oscilloscope control voltages, and comprising a tube of insulating material adapted to be carried in the hand of a person, a cathode ray oscilloscope tube within said insulating tube and having ray deflecting electrodes, an end of said cathode ray tube being viewable through an end of said insulating tube for the observance of wave shapes on said cathode ray tube, a metallic shield in said insulating tube and disposed about said cathode ray tube, a metallic probe secured to said insulating tube and extending externally therefrom, and cable means connected to said metallic probe and to said deflecting electrodes and connected to said source of control voltages.

3. Circuit testing means, comprising a tube of insulating material adapted to be carried in the hand of a person, a solid body of insulating material connected to the lower end of said tube, a metallic probe extending through said body and extending externally therefrom, a socket in said insulating tube, a cathode ray oscilloscope within said insulating tube and seated in said socket, and having ray deflecting electrodes, an end of said cathode ray tube being viewable through the upper end of said insulating tube for the observance of wave shapes on said cathode ray tube, a metallic tube in said insulating tube and disposed about said cathode ray tube in shielding relation thereto, and cable means connected to said metallic probe and to said deflecting electrodes and connectable to a source of control voltages for said cathode ray tube.

4. The circuit testing means described in claim 3, wherein said cable means connected to the said probe includes a metal shielding, a wire connected to said shielding and an expansible ground clip connected to said wire.

5. The circuit testing means described in claim 3, wherein said metallic tube is retained in said tube of insulating material by a ring member.

References Cited in the file of this patent

UNITED STATES PATENTS

| | | |
|---|---|---|
| 2,274,692 | Heim | Mar. 3, 1942 |
| 2,487,641 | Denk | Nov. 8, 1949 |